Figure 1:
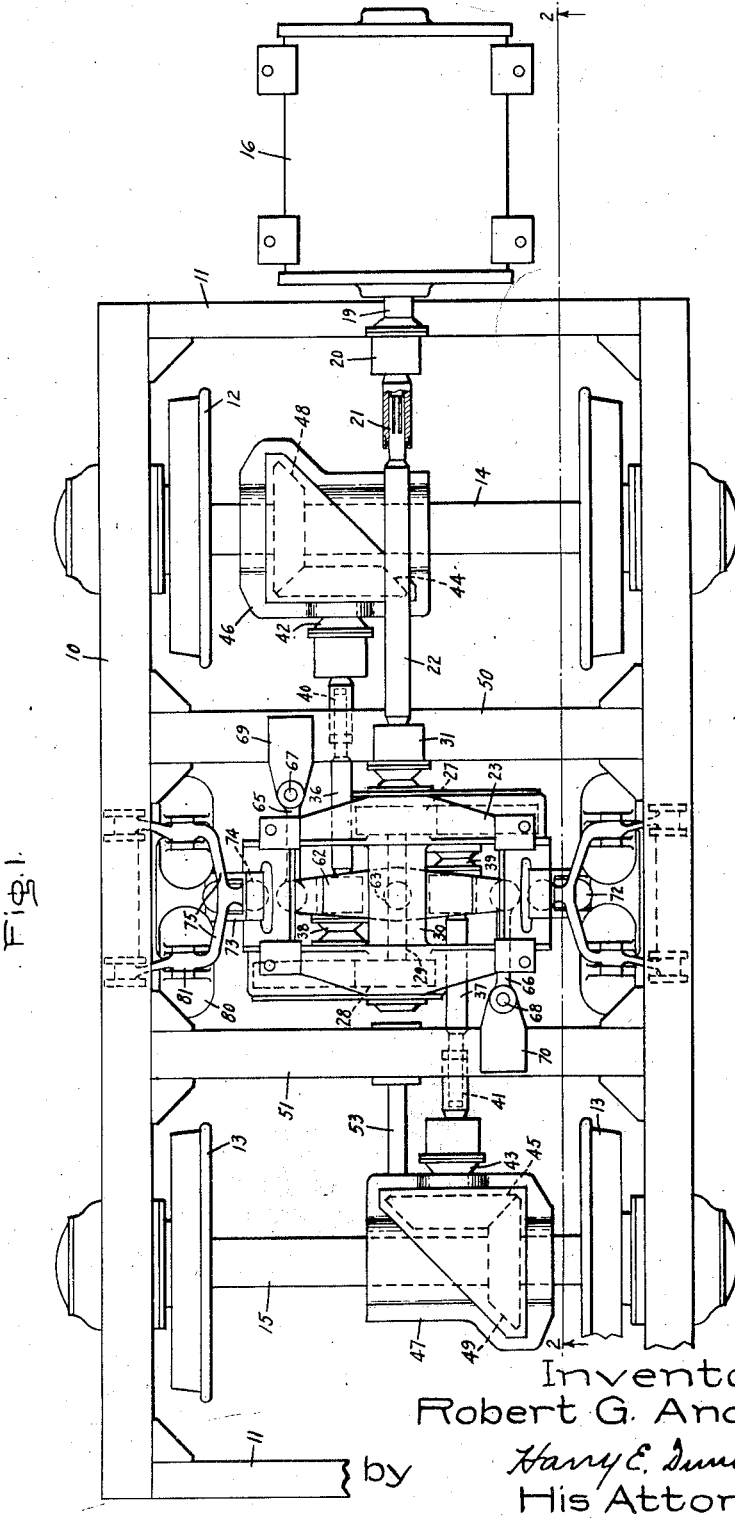

Aug. 8, 1944.  R. G. ANDERSON  2,355,409
VEHICLE DRIVE
Filed Sept. 29, 1942  2 Sheets-Sheet 1

Inventor:
Robert G. Anderson,
by Harry E. Dunham
His Attorney.

Aug. 8, 1944.  R. G. ANDERSON  2,355,409
VEHICLE DRIVE
Filed Sept. 29, 1942  2 Sheets-Sheet 2
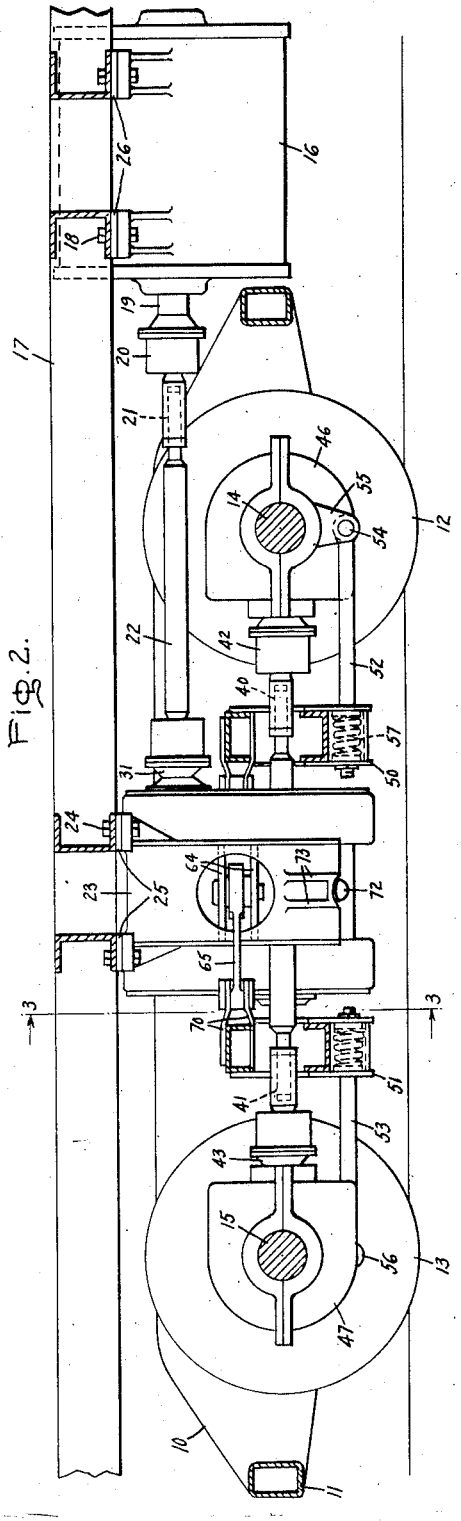
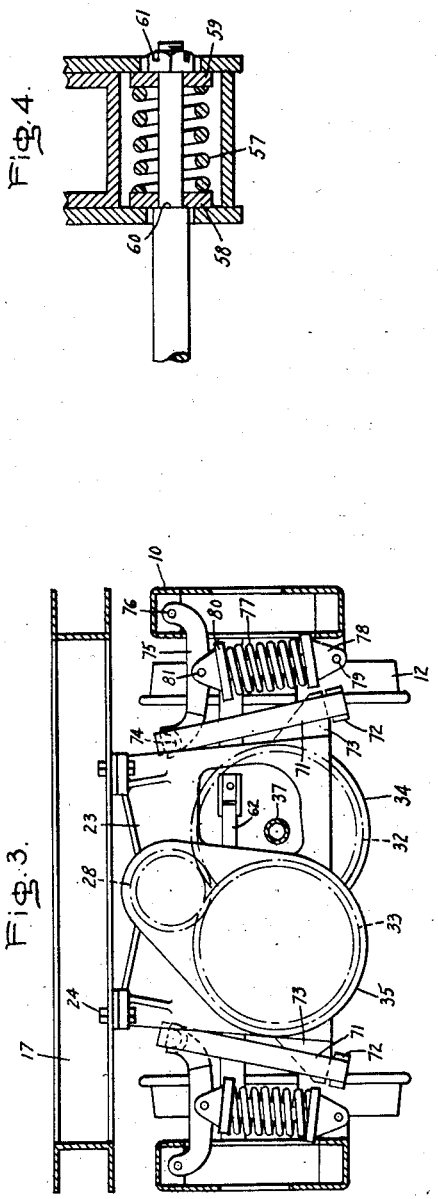
Inventor:
Robert G. Anderson,
by Harry E. Dunham
His Attorney.

Patented Aug. 8, 1944

2,355,409

UNITED STATES PATENT OFFICE 2,355,409

VEHICLE DRIVE

Robert G. Anderson, Erie, Pa., assignor to General Electric Company, a corporation of New York Application September 29, 1942, Serial No. 460,049

13 Claims. (Cl. 105—117)

My invention relates to vehicle drives and more particularly to a driving construction adapted for use on railway vehicles.

An object of my invention is to provide an improved vehicle drive having a minimum truck weight and a minimum truck swiveling inertia.

Another object of my invention is to provide an improved vehicle drive wherein the traction forces are transmitted to the vehicle frame from a driving truck through a frame supporting structure.

A further object of my invention is to provide an improved vehicle driving truck having a relatively low support for the vehicle frame on the truck through which tractive forces are transmitted.

Further objects and advantages of my invention will become apparent and my invention will be better understood from the following description referring to the accompanying drawings, and the features of novelty which characterize my invention will be pointed out with particularity in the claims annexed to and forming part of this specification.

In the drawings Fig. 1 is a plan view of a vehicle driving truck provided with an embodiment of my improved vehicle drive; Fig. 2 is a side elevational view of the construction shown in Fig. 1 illustrating its arrangement relative to a vehicle frame; Fig. 3 is a sectional view, taken along line 3—3 of Fig. 2; and Fig. 4 is an enlarged sectional view of the axle truck restraint mechanism shown in Fig. 2.

Referring to the drawings I have shown my improved vehicle drive in connection with a railway driving truck having truck side frames 10 connected together at the ends thereof by end frames 11. The truck frame is adapted to be supported by vehicle driving wheels 12 and 13 mounted on driving axles 14 and 15, respectively. Mechanical power is supplied to the driving truck by any suitable source, such as the electric motor 16, which is rigidly secured to the underside of a vehicle frame 17 by bolts 18. The electric motor 16 is provided with a drive shaft 19 which is connected by a universal joint 20 to a longitudinally adjustable splined connection 21 formed with a torque shaft 22 adapted to transmit power from the motor 16 to a set of gears supported in a gear box 23. The gear box 23 is rigidly secured to the vehicle frame 17 by a plurality of bolts 24, and pads 25 and 26 of resilient material, such as rubber, are arranged between the rigid mounting of the gear box 23 and of the motor 16 and the supporting portions of the vehicle frame 17 in order to minimize the transmission of vibrations from the driving mechanism to the vehicle frame. In order to obtain the smallest angular motion between the gear box 23 and the driving axles 14 and 15, the gear box has been made double; that is, it contains two sets of gears mounted on separate centers. The gearing in the gear box includes a pair of pinion gears 27 and 28 mounted on a shaft 29 which is rotatably supported in a gear box bearing 30. These pinion gears are arranged to be driven by the torque shaft 22 through a universal joint 31 and the pinion gears 27 and 28 mesh respectively with gears 32 and 33 supported in end housing sections 34 and 35 of the gear box 23. The gears 32 and 33 are connected respectively to torque shafts 36 and 37 by universal joints 38 and 39. The shafts 36 and 37 are in turn connected by longitudinally adjustable splined connections 40 and 41 to universal joints 42 and 43 having driving connections with bevel gears 44 and 45, respectively. The bevel gears 44 and 45 are rotatably mounted in axle gear casings 46 and 47 and have a driving connection with bevel gears 48 and 49 secured to the axles 14 and 15, respectively. With this type drive, relative tilting of the axles and transverse movement of the truck relative to the driving motor 16 and gear box 23, as well as swiveling of the truck relative to the vehicle frame, has no effect on transmittal of power from the motor 16 to the driving axles 14 and 15 and it can be transmitted without the transfer of stresses therebetween due to the relative movements of the truck and the vehicle frame. Rotation of the axle gear casings 46 and 47 is prevented by a cushioning device mounted on a pair of transoms 50 and 51 rigidly secured to the side frames 10 of the truck. Torsion rods 52 and 53 are pivotally secured by a pivot 54 to lugs 55 and 56 on the axle gear boxes 46 and 47, respectively, and the ends thereof away from the axle gear boxes are connected to the transoms 50 and 51 through a restoring mechanism. Each of these restoring mechanisms includes a compression spring 57 arranged under compression between spring seats 58 and 59 in a housing formed by the transoms. The ends of the torsion rods extend through openings in the spring seats 58 and 59, and a shoulder 60 on each of the torsion rods is arranged to engage the outer side of the spring seat 58, and a nut 61 threadedly engages the outer end of the torsion rods and engages the outer side of the spring seat 59 to retain the spring 57 under compression between the torsion rod shoulder 60 and the nut 61. This construction provides for a slight cushioned amount of relative torsional movement of the axle gear box relative to the truck frame.

The tractive effort is transmitted from the axles to the truck frame and from the truck frame to the vehicle frame through the gear box 23 by a link mechanism which provides for relative movement of the truck and the vehicle frame. This link mechanism for transmitting longitudinal forces includes an equalizer 62 which is pivotally secured adjacent the center thereof by a pivot pin 63 to longitudinally extending bars 64 rigidly secured to the gear box 23. Links 65 and 66 are pivotally secured to the equalizer 62 adjacent one end of the links and pivotally secured by pivot pins 67 and 68 at the other ends thereof to supporting plates 69 and 70 which are rigidly secured to the truck transoms 50 and 51, respectively. This linkage mechanism is arranged relatively low on the truck and thereby provides an arrangement for transmitting longitudinal forces between the truck and the vehicle similar to a conventional center plate bearing with the advantage of being located substantially in the same horizontal plane as the driving axles 14 and 15 and, therefore, provides for a minimum of weight shifting from one axle to another when motoring or braking. This mechanism does not transmit any vertical load between the truck and the vehicle frame.

The weight of the vehicle is transmitted through the gear box 23 to the truck through a link mechanism comprising swing links 71 arranged on each side of the gear box 23 and pivotally connected to the gear box adjacent the outer edge of the lower side thereof on pivot ball bearings 72 which engage supporting lugs 73 formed on the gear box 23. The swing links are pivotally supported by a ball seat pivotal bearing 74 on a supporting link 75 provided with a bifurcated end which is pivotally secured by pivot pins 76 to side frames 10 of the truck. The ball seat pivot support 74 for the swing links 71 is arranged to extend nearer the longitudinal center of the truck than the pivotal supports 72 at the lower ends of the swing links and thereby provide a gravity centering device for transversely centering the gear box 23 relative to the truck. Each of the supporting links 75 is resiliently supported by a pair of compression springs 77 pivotally connected to the truck side frame 10 through a lower spring seat 78 which is pivotally secured by a pivot pin 79 to the truck side frame 10. The upper end of each spring 77 engages an upper spring seat 80 which is pivotally secured by a pivot pin 81 to an arm of the supporting link 75 at a point relatively lower than the pivotal supporting pin 76 which connects the link 75 to the truck side frame 10. The spring 77 also is arranged at a slight angle to the vertical by arranging the pivot supporting pin 81 relatively nearer the longitudinal center of the truck than the pivotal supporting pin 79 thereby providing for an angular position of the spring 77 with the upper end of the spring nearer the longitudinal center of the truck than the lower end of the spring. This spring supporting arrangement provides a decreasing spring rate for a downward movement of the car body due to the spring deflection and an increased spring rate for an upward movement of the car body with the rebound of the spring. This resilient supporting characteristic provides a softer spring support for a given size spring with an inherent tendency to dampen out spring shocks and provides a resilient support for the vehicle on the truck frame through the gear box and the gear box centering device and also providing for transverse swiveling of the truck relative to the vehicle.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A vehicle drive construction for a vehicle having a frame and a plural axle truck for supporting said vehicle frame including a motor secured to said vehicle frame, a gear box rigidly secured to said vehicle frame adjacent the center of said truck, gearing mounted in said gear box, means for providing a driving connection between said gearing and said motor, means including a universal connection for providing a driving connection between said gearing and said axles without the transmittal of stresses therebetween due to misalignments thereof, means including a gravity centering device connected to said gear box and to said truck for transversely centering said gear box relative to said truck and for supporting said vehicle on said truck through said gear box and providing for transverse swiveling of said truck relative to said vehicle, and means for transmitting longitudinal forces from said truck to said vehicle through said gear box.

2. A vehicle drive construction for a vehicle having a frame and a plural axle truck for supporting said frame and provided with a source of mechanical power secured to said vehicle frame, a gear box rigidly secured to said vehicle frame, gearing mounted in said gear box, means for providing a driving connection between said gearing and said source of mechanical power, means for providing a driving connection between said gearing and said axles without the transmittal of stresses therebetween due to misalignments thereof, means including a gravity centering device connected to said gear box and to said truck for transversely centering said gear box relative to said truck and providing for transverse swiveling of said truck relative to said vehicle, and resilient means arranged to support said gear box on said truck for supporting said vehicle on said truck through said gear box and said centering device.

3. A vehicle drive construction for a vehicle having a frame and a plural axle truck for supporting said frame including a motor secured to said vehicle frame, a gear box secured to said vehicle frame, sets of gearing mounted in said gear box, means for providing a driving connection between said gearing and said motor, means including a universal connection for providing a driving connection between said gear sets and said axles without the transmittal of stresses therebetween due to misalignments thereof, means including swing links pivotally connected to said gear box and supporting links pivotally secured to said truck and to said swing links to provide a gravity centering device for transversely centering said gear box relative to said truck, and resilient means arranged to support said supporting links on said truck for supporting said vehicle on said truck through said gear box and said centering device.

4. A vehicle drive construction for a vehicle having a frame and a plural axle truck for supporting said frame including a source of mechanical power secured to said vehicle frame, a gear box rigidly secured to said vehicle frame, sets of gearing mounted in said gear box, means for providing a driving connection between said gearing and said source of mechanical power, means including a universal and longitudinally adjustable connection for providing a driving connection between said gear sets and said axles without the transmittal of stresses therebetween due to misalignments thereof, means including a gravity centering device connected to said gear box and to said truck for transversely centering said gear box relative to said truck and providing for transverse swiveling of said truck relative to said vehicle, and resilient means arranged to support said gear box on said truck for supporting said vehicle on said truck through said gear box and said centering device.

5. A vehicle drive construction for a vehicle having a frame and a plural axle truck for supporting said frame including a source of mechanical power secured to said vehicle frame, a gear box secured to said vehicle frame adjacent the center of said truck, gearing mounted in said gear box, means for providing a driving connection between said gearing and said source of mechanical power, means including a universal connection for providing a driving connection between said gearing and said axles without the transmittal of stresses therebetween due to misalignments thereof, resilient means arranged to support said gear box on said truck for supporting said vehicle frame on said truck through said gear box, and means including a link mechanism comprising an equalizer pivotally secured adjacent the center thereof to said gear box and links pivotally secured to said equalizer and to said truck for transmitting longitudinal forces from said truck to said vehicle through said gear box.

6. A vehicle drive construction for a vehicle having a frame and a truck having an axle for supporting said frame and provided with a motor secured to said vehicle frame, a gear box secured to said vehicle frame, gearing mounted in said gear box, means for providing a driving connection between said gearing and said motor, means including a universal connection for providing a driving connection between said gearing and said axle without the transmittal of stresses therebetween due to misalignments thereof, means including a gravity centering device having supporting links pivotally connected to said truck for supporting and transversely centering said gear box relative to said truck, and means including a spring connected at one end to said truck and connected adjacent the other end thereof to support said supporting links for supporting said vehicle on said truck through said gear box and said centering device.

7. A vehicle drive construction for a vehicle having a frame and a plural axle truck for supporting said frame including a motor secured to said vehicle frame, a gear box secured to said vehicle frame, gearing mounted in said gear box, means for providing a driving connection between said gearing and said motor, means including a universal connection for providing a driving connection between said gearing and axles of said plural axle truck without the transmittal of stresses therebetween due to misalignments thereof, means including a gravity centering device having supporting links pivotally connected to said truck for supporting and transversely centering said gear box relative to said truck, and means including a spring pivotally connected at one end to said truck and connected adjacent the other end thereof to support said supporting links for supporting said vehicle on said truck through said gear box and said centering device.

8. A vehicle drive construction for a vehicle having a frame and a plural axle truck for supporting said frame including a motor secured to said vehicle frame, a gear box secured to said vehicle frame, sets of gearing mounted in said gear box, means for providing a driving connection between said gearing and said motor, means including a universal connection for providing a driving connection between said gear sets and said axles without the transmittal of stresses therebetween due to misalignments thereof, means including a gravity centering device having supporting links pivotally connected to said truck for supporting and transversely centering said gear box relative to said truck, and means including a compression spring pivotally connected at one end to said truck and supported thereon and pivotally connected adjacent the other end thereof to support said supporting links for supporting said vehicle on said truck through said gear box and said centering device.

9. A vehicle drive for a vehicle having a frame and a plural axle truck for supporting said frame including a motor secured to said vehicle frame, a gear box secured to said vehicle frame, sets of gearing mounted in said gear box, means for providing a driving connection between said gearing and said motor, means including a universal connection for providing a driving connection between said gear sets and said axles without the transmittal of stresses therebetween due to misalignments thereof, means including a gravity centering device for transversely centering said gear box relative to said truck, a compression spring pivotally connected at one end to said truck and supported thereon, and means including said compression spring and supporting links pivotally connected to said truck and said gear box and also to the other end of said spring to support said gear box for supporting said vehicle on said truck through said gear box and said centering device, said pivotal connections of said springs to said supporting links being relatively lower than said pivotal connection of said supporting links to said truck.

10. A vehicle drive construction for a vehicle having a frame and a plural axle truck for supporting said frame including a motor secured to said vehicle frame, a gear box secured to said vehicle frame, sets of gearing mounted in said gear box, means for providing a driving connection between said gearing and said motor, means including a universal connection for providing a driving connection between said gear sets and said axles without the transmittal of stresses therebetween due to misalignments thereof, means including swing links pivotally connected to said gear box and supporting links pivotally secured to said truck and having a pivotal connection to said swing links nearer the longitudinal center of said truck than the pivotal connection of said swing links and said gear box to provide a gravity centering device for transversely centering said gear box relative to said truck, and resilient means arranged to support said supporting links on said truck for supporting said vehicle on said truck through said gear box and said centering device.

11. A vehicle drive construction for a vehicle having a frame and a plural axle truck for supporting said frame including a source of mechanical power secured to said vehicle frame, a gear box secured to said vehicle frame adjacent the center of said truck, sets of gearing mounted in said gear box, means for providing a driving connection between said gearing and said source of mechanical power, means including a universal connection for providing a driving connection between said gear sets and said axles without the transmittal of stresses therebetween due to misalignments thereof, means including a gravity centering device for transversely centering said gear box relative to said truck, resilient means for supporting said vehicle on said truck through said gear box and said centering device, and means including a link mechanism comprising an equalizer pivotally secured adjacent the center thereof to said gear box and links pivotally secured to said equalizer and to said truck for transmitting longitudinal forces from said truck to said vehicle through said gear box.

12. A vehicle drive construction for a vehicle having a frame and a plural axle truck for supporting said frame including a motor secured to said vehicle frame, a gear box secured to said vehicle frame, sets of gearing mounted in said gear box, means for providing a driving connection between said gearing and said motor, means including a universal connection for providing a driving connection between said gear sets and said axles without the transmittal of stresses therebetween due to misalignments thereof, means including swing links pivotally connected to said gear box adjacent the outer edge of the lower side thereof and supporting links pivotally secured to said truck and having a ball seat pivotal connection to said swing links adjacent the upper ends thereof and extending nearer the longitudinal center of said truck than the pivotal connection of said swing links and said gear box to provide a gravity centering device for transversely centering said gear box relative to said truck, and resilient means arranged to support said supporting links on said truck for supporting said vehicle on said truck through said gear box and said centering device.

13. A vehicle drive for a vehicle having a frame and a plural axle truck for supporting said frame including a motor secured to said vehicle frame, a gear box secured to said vehicle frame, gearing mounted in said gear box, means for providing a driving connection between said gearing and said motor, means including a universal connection for providing a driving connection between said gearing and said axles without the transmittal of stresses therebetween due to misalignments thereof, means including swing links pivotally connected to said gear box adjacent the outer edge of the lower side thereof and supporting links pivotally secured to said truck and having a ball seat pivotal connection to said swing links adjacent the upper ends thereof and extending nearer the longitudinal center of said truck than the pivotal connection of said swing links and said gear box to provide a gravity centering device for transversely centering said gear box relative to said truck, and resilient means including a compression spring pivotally connected at one end to said truck and supported thereon and pivotally connected adjacent the other end thereof to support said supporting links for supporting said vehicle on said truck through said gear box and said centering device, said pivotal connections of said springs to said supporting links being relatively lower than said pivotal connection of said supporting links to said truck.

ROBERT G. ANDERSON.